United States Patent [19]

Matsufuji et al.

[11] Patent Number: 4,593,295

[45] Date of Patent: Jun. 3, 1986

[54] INK JET IMAGE RECORDING DEVICE WITH PITCH-SHIFTED RECORDING ELEMENTS

[75] Inventors: Yohji Matsufuji; Hiroo Ichihashi, both of Tokyo, Japan

[73] Assignee: Canon Kabushiki Kaisha, Tokyo, Japan

[21] Appl. No.: 496,437

[22] Filed: May 20, 1983

[30] Foreign Application Priority Data

Jun. 8, 1982 [JP] Japan .................................. 57-96931
Jun. 8, 1982 [JP] Japan .................................. 57-96930

[51] Int. Cl.$^4$ ............................................. G01D 15/16
[52] U.S. Cl. ................................................ 346/140 R
[58] Field of Search .......................... 346/140 PD, 75

[56] References Cited

U.S. PATENT DOCUMENTS 3,988,745 10/1976 Sultan .......................... 346/140 PD
4,232,324 11/1980 Tsao ..................................... 346/75
4,320,406 3/1982 Heinzl .......................... 346/140 PD
4,385,304 5/1983 Sniderman ................... 346/140 PD
4,401,991 8/1983 Martin .................................. 346/75
4,413,275 11/1983 Horiuchi .............................. 346/75
4,415,909 11/1983 Italiano ................................ 346/75

OTHER PUBLICATIONS

Pelkie, IBM Tech. Disc. Bull., vol. 20, #2, Jul. 1977, pp. 553-554, "Ink Jet Head".

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An image recording device comprises a plural number of recording heads for jetting inks with respective different colors. The device performs recording of color images on a paper while reciprocally moving the recording heads in the direction in which they are arranged. First and second groups of recording heads are provided for respective colors, and the first group of recording heads are arranged in position with a predetermined pitch shifted in the direction of the arrangement of the ink jetting orifices of the respective heads from the second group of recording heads.

6 Claims, 6 Drawing Figures

INK JET IMAGE RECORDING DEVICE WITH PITCH-SHIFTED RECORDING ELEMENTS

BACKGROUND OF THE INVENTION

1. Field of the Invention

This invention relates to an image recording device, more particularly to an image recording device which records color images while moving reciprocally a plural number of recording heads for inks with different colors in the direction orthogonal to the paper conveying direction.

2. Description of the Prior Art

As a color recording device using a multi-head for inks with different colors, there may be mentioned an ink-jet printer which performs color printing according to subtractive color mixing by jetting inks through jetting nozzles to have inks adhered on the same spot on a recording paper.

Color recording by ink-jet of the prior art performs image recording according to subtractive color mixing with the use of the three colors of yellow, magenta and cyan (hereinafter abbreviated as Y, M and C, respectively) or the four colors including black (hereinafter abbreviated as B) in addition to the above three colors as shown in FIG. 1. Since plural colors cannot use commonly the same nozzle, there has been known in the art a serial print system in which four recording heads 1 for exclusive use for respective colors are arranged on a carriage 2 and recording of images is performed while moving reciprocally the carriage 2 in the direction orthogonal to the conveying direction of the recording paper 3 by means of a platen 4 (as shown by the arrows in the drawing). In most of the devices performing recording according to such a system, for the purpose of accelerating the recording speed, recording is carried out in both going and returning travels of heads.

Such an image recording device which performs recording in both going and returning travels had the following drawbacks. That is, in the device as described above, recording is carried out with the recording heads 1 having orifices (jetting holes) in a vertical array being laterally arranged, whereby the order of ink jetting during recording in the going travel differs from that in the returning travel as shown in FIG. 2 (in the Figure, there is shown an example of recording heads having four orifices, and ink is jetted in the order of Y, M, C and B in the going travel, while in the order of B, C, M and Y in the returning travel). As the result, color formations were inevitably different, although the extent of difference may vary depending on the compatibility between the paper and the ink, to alter disadvantageously the finished color textures.

That is, when reciprocal recording is performed by use of recording heads having a recording width of l as shown in FIG. 1, the color recording obtained will be one as shown in FIG. 2 wherein color texture differs alternately for each interval of l.

This is because subtractive color mixing is effected on a recording paper in conventional ink jet printers and color formation by subtractive color mixing will differ depending on the order of color mixing on a recording paper which is different in the going travel from that in the returning travel. If this drawback is to be overcome by performing dot recording only by travelling in one direction, the actuation in the returning travel of the heads will be a mere displacement from the beginning to the end, whereby lowering of total recording speed will be brought about.

SUMMARY OF THE INVENTION

The present invention overcomes the drawback possessed by the device of the prior art as described above and its object is to provide an image recording device which is capable of obtaining uniform color images with a simple structure and also capable of actuating at a high speed.

In order to accomplish the above object, the present invention has employed a plural number of recording heads constituted of plural groups of heads including still another group of heads under charge of inks with different colors and also employed a constitution in which said plural groups of recording heads are arranged with the heads in each group being shifted in position in the paper conveying direction alternately from those in the other group.

According to the present invention, there is provided an image recording device comprising a plural number of recording heads for jetting inks with respective different colors arranged which performs recording of color images on a paper while reciprocally moving the recording heads in the direction in which they are arranged, first and second groups of recording heads being provided for respective colors, and the said first group of recording heads being arranged in position with a predetermined pitch shifted in the direction of the arrangement of the ink jetting orifices of the respective heads from the second group of recording heads.

DESCRIPTION OF PREFERRED EMBODIMENT

Figure 1:
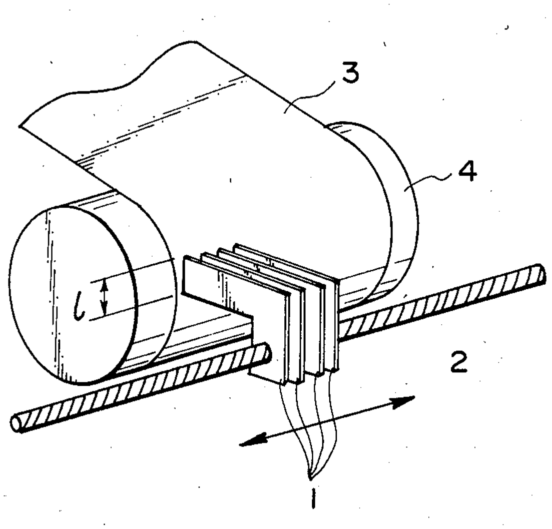
FIG. 1 PRIOR ART
FIGS. 1 and 2 illustrate the constitution and actuation of the image recording devices of the prior art, FIG. 1 showing a perspective view for illustration of a schematic constitution of the image recording device of the prior art and FIG. 2 a drawing for illustration of actuation of the image recording device of the prior art.
Figure 2:
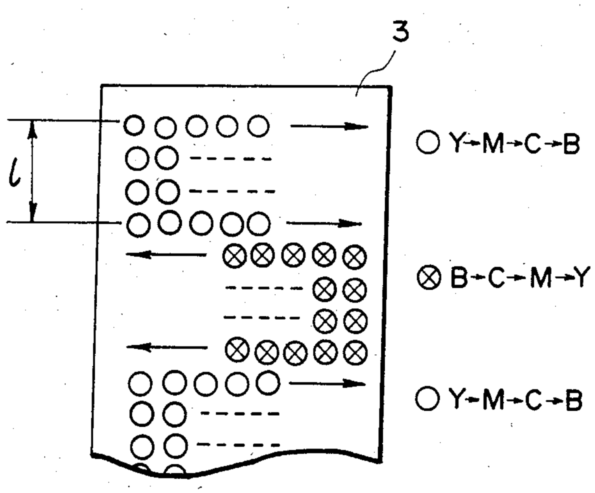
FIG. 2 PRIOR ART

Referring now to the embodiment shown in the drawings, the present invention is to be described in detail.

Figure 3:
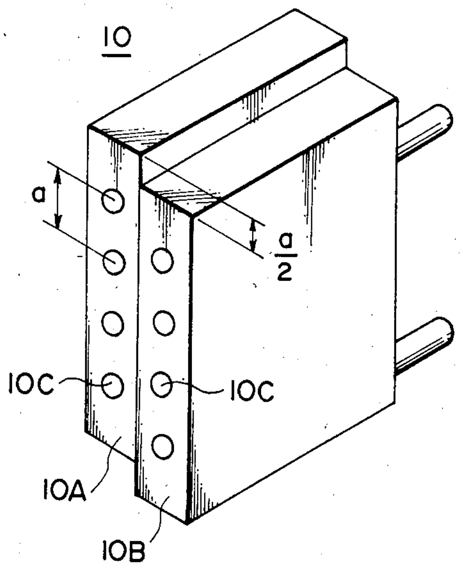
FIGS. 3 through 6 illustrate the constitutions and actuations of the embodiments of the present invention, FIG. 3 showing a perspective view for illustration of the structure of the recording head of the image recording device of the present invention, FIG. 4 a front view for illustration of the structure of the recording section of the image recording device of the present invention, FIG. 5 a drawing for illustration of actuation of the image recording device of the present invention, and FIG. 6 a perspective view for illustration of another embodiment of the present invention.

FIG. 3 shows an embodiment of the recording head of the image recording device of the present invention, wherein the recording head 10 is constituted of two head units 10A and 10B shifted in parallel by a/2, each unit having four orifices 10C on the face confronting a recording paper at intervals of a predetermined pitch of a. The pair of head units 10A and 10B are independent of each other, each having tubes for supplying inks at the rear portion on the side opposite to the face having orifices 10C and the respective units are under charge of inks for recording with different colors.

Figure 4:
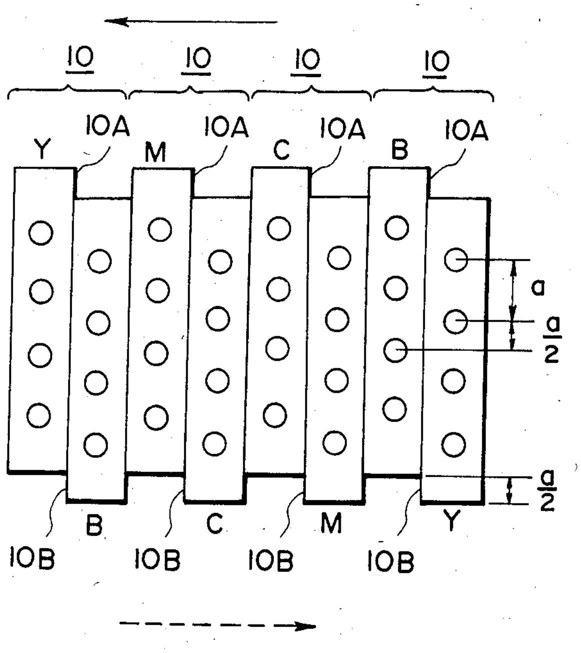

In the image recording device of the present invention, the above heads 10 are arranged in a necessary number of colors on the carriage to provide the recording section. FIG. 4 shows an embodiment wherein the above recording heads are arranged as the color section of the four colors of Y, M, C and B (in said Figure, the recording heads 10, 10, 10 and 10 as seen from the recording paper side are shown). The arrangement of colors in the head unit 10A shifted upward is made just opposite in the order to that in the head unit 10B shifted downward, as exemplarily indicated on the upper sides and the lower sides of the respective recording heads. With such an arrangement, when the pitch a between the orifices of respective head units 10A and 10B is set relative to a desirable image density P (dots/mm) as $a=2/P$ (namely the shift between the respective head units is $a/2=1/P$), it is possible to obtain a desired image density. To speak conversely, the pitch between the orifice of the respective head units, when aiming to obtain the same image density as in the prior art, can be made twice as much as the pitch employed in the prior art, whereby head units can be manufactured by far more easily than in the prior art.

Figure 5:
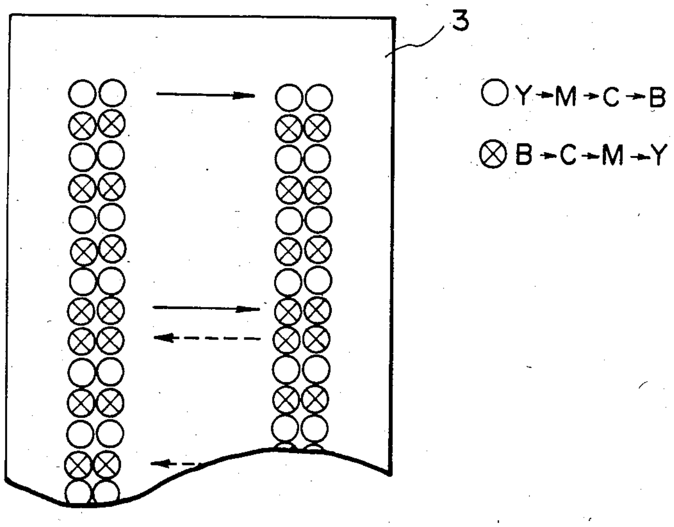

The recording section as constituted above can perform recording of 8 dots per one line at one time as shown in FIG. 5. That is, in the recording actuation for the first line (as shown by the arrow of solid lines in FIGS. 4 and 5), the four head units shifted upward 10A, 10A, 10A and 10A under charge of the colors Y, M, C and B, respectively, apply ink jetting four times in the order of Y, M, C and B on the same spot, while the four head units shifted downward apply ink jetting in the order of B, C, M and Y. In short, as constracted to the prior art example, wherein the difference in color texture appeared per 4 dots in the conveying direction of the recording paper 3, the difference in color texture according to the present invention appears every one dot.

Human eyes have a dullness in judgment about colors which is known as the small area third color vision defective, and therefore, generally speaking, can hardly judge correctly the colors when the vision angle is within 10′. For example, when a printed material is placed at a distance of district vision (about 30 cm), the slight difference in color texture between the lines or dots aparted by 800 μm or less cannot substantially be recognized. Accordingly, the color texture of the dots apart by one dot in general cannot be recognized, but it is rather recognized as a uniform color image.

In the embodiment as described above, there is employed the constitution in which head units having the same number of orifices are arranged, being shifted up and down at a certain pitch, and therefore at the boundary between the going travel and the returning travel in FIG. 5, the dots with the same jetting order are arranged side by side. In view of this point, an embodiment as shown in FIG. 6 may be considered for achieving more completely the object of the present invention.

Figure 6:
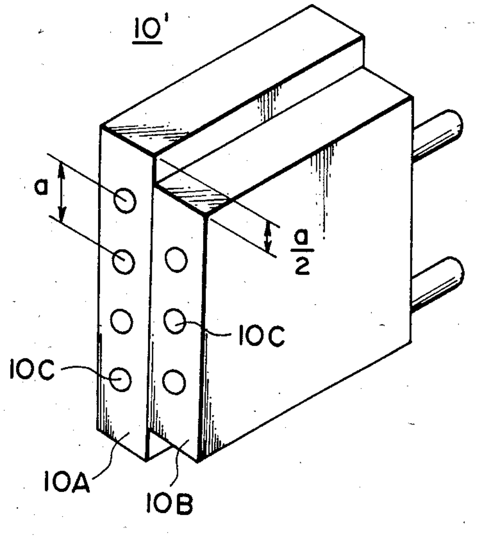

The recording head 10′ as shown in FIG. 6 has a head unit 10A having four orifices 10C for ink jetting on the face confronting a recording paper arranged at predetermined pitches of a and a head unit 10B having three orifices 10C for ink jetting arranged at the same pitches of a, which is arranged with a parallel shift of orifices between the two units by a/2. That is, the recording head 10′ has an odd number of orifices for ink jetting smaller by one than the embodiment as shown in FIG. 3.

When a recording head having such a constitution is arranged as shown in FIG. 4, the order of jetting colors in the dot array at the lowest stage in the going travel is the same as the dot array at the uppermost stage in the returning travel, whereby the above problem can be solved.

As apparently seen from the above description, according to the present invention, there is employed a plural number of recording heads constituted of plural groups of heads including still another group of heads under charge of inks with different colors and also a constitution in which said plural groups of recording heads are arranged with the heads in each group being shifted in position in the paper conveying direction alternately from those in the other group, whereby it is possible to suppress inversion of color texture per one dot, thus providing an image recording device with a simple structure capable of giving uniform color image which can be actuated at a high speed.

What we claim is:

1. An image recording device comprising:

at least two groups of ink-jetting orifices, each said group being arranged in a plurality of arrays of orifices for jetting inks of a like plurality of different colors, for recording a color image;

means for relatively moving the image recording device and a recording medium in a predetermined direction along which said arrays are disposed while a color image is recorded, wherein said groups are disposed in said arrays with a predetermined pitch and said arrays in one said group are shifted from said arrays in the other said group in a direction substantially normal to the predetermined direction; and means for providing each said array in one said group with a different color ink.

2. An image recording device according to claim 1 wherein said orifices in each said array are arranged in a substantially straight line and said arrays are arranged side-by-side.

3. An image recording device according to claim 2, wherein said groups are two in number, said arrays of different said groups are arranged to alternate in the predetermined direction and said orifices are substantially evenly spaced in said arrays with the orifices in adjacent said arrays being shifted substantially half the distance between orifices.

4. An image recording device according to claim 1, wherein said groups are two in number and said arrays of one said group each include an even number of said orifices and said arrays of said second group have an odd number of said orifices.

5. An image recording device according to claim 4, wherein said arrays of different said groups are arranged to alternate in the predetermined direction.

6. An image recording device according to claim 5, wherein the different colors of ink are adapted to be provided in a particular order to said arrays in said group and in the reverse order to said arrays in the other said group.

* * * * *